(12) United States Patent
Knorr et al.

(10) Patent No.: US 12,442,921 B2
(45) Date of Patent: Oct. 14, 2025

(54) OPTOELECTRONIC SEMICONDUCTOR COMPONENT AND METHOD FOR PRODUCING AN OPTOELECTRONIC SEMICONDUCTOR COMPONENT

(71) Applicant: OSRAM Opto Semiconductors GmbH, Regensburg (DE)

(72) Inventors: Fabian Knorr, Postbauer-Heng (DE); Tony Albrecht, Bad Abbach (DE); Markus Boss, Regensburg (DE)

(73) Assignee: OSRAM OPTO SEMICONDUCTORS GMBH, Regensburg (DE)

( * ) Notice: Subject to any disclaimer, the term of this patent is extended or adjusted under 35 U.S.C. 154(b) by 1092 days.

(21) Appl. No.: 17/432,326

(22) PCT Filed: Feb. 21, 2020

(86) PCT No.: PCT/EP2020/054644
§ 371 (c)(1),
(2) Date: Aug. 19, 2021

(87) PCT Pub. No.: WO2020/173830
PCT Pub. Date: Sep. 3, 2020

(65) Prior Publication Data
US 2022/0171057 A1    Jun. 2, 2022

(30) Foreign Application Priority Data

Feb. 27, 2019    (DE) .......................... 102019104986.5

(51) Int. Cl.
*G02B 27/42*    (2006.01)
*G01S 7/481*    (2006.01)
(Continued)

(52) U.S. Cl.
CPC ............ *G01S 17/08* (2013.01); *G01S 7/4814* (2013.01); *G01S 7/484* (2013.01); *G01S 7/4865* (2013.01);
(Continued)

(58) Field of Classification Search
CPC ........ G01S 17/08; G01S 7/4814; G01S 7/484; G01S 7/4865; G01S 17/04; H01S 5/0232;
(Continued)

(56) References Cited

U.S. PATENT DOCUMENTS 6,283,644 B1 * 9/2001 Gilliland .............. G02B 6/4244
385/88
6,728,034 B1 * 4/2004 Nakanishi ............ G11B 7/1395
(Continued)

FOREIGN PATENT DOCUMENTS

| CN | 102823087 A | 12/2012 |
|---|---|---|
| CN | 103196562 A | 7/2013 |

(Continued)

OTHER PUBLICATIONS

First Chinese Office Action issued in corresponding Chinese Patent Application No. 2020800170970 dated Jan. 31, 2024, with English translation, 15 pages.
(Continued)

*Primary Examiner* — Xinning(Tom) Niu
(74) *Attorney, Agent, or Firm* — MH2 Technology Law Group LLP

(57) ABSTRACT

In an embodiment, the optoelectronic semiconductor device comprises an optoelectronic semiconductor chip for emitting a radiation. An optical element is disposed downstream of the semiconductor chip. The semiconductor chip and the optical element are embedded in a potting body. The optical element comprises a structured, contiguous and optically effective area, which is located inside the optical element (Continued)

directly at an optical contrast region, preferably an evacuated or gas-filled cavity. The optically effective area completely covers a radiation exit area of the semiconductor chip.

18 Claims, 5 Drawing Sheets

(51) Int. Cl.
G01S 7/484 (2006.01)
G01S 7/4865 (2020.01)
G01S 17/08 (2006.01)
H01S 5/02234 (2021.01)
H01S 5/0232 (2021.01)
H01S 5/183 (2006.01)

(52) U.S. Cl.
CPC ........ *H01S 5/0232* (2021.01); *H01S 5/02234* (2021.01); *H01S 5/183* (2013.01)

(58) Field of Classification Search
CPC .. H01S 5/02234; H01S 5/183; H01S 5/02257; H01S 5/0231; H01S 5/02345; H01S 5/02253; H01S 5/02255; H01S 5/02216; G02B 27/0006; G02B 27/4277; G02B 27/48
See application file for complete search history.

(56) References Cited

U.S. PATENT DOCUMENTS

| | | | |
|---|---|---|---|
| 6,778,574 B1 | 8/2004 | Shimonaka et al. | |
| 2001/0012099 A1 | 8/2001 | Kumagai | |
| 2003/0128726 A1* | 7/2003 | Tatsuno | G11B 7/127 372/36 |
| 2009/0038843 A1 | 2/2009 | Yoneda et al. | |
| 2013/0039374 A1 | 2/2013 | Lutgen et al. | |
| 2013/0175449 A1* | 7/2013 | Favier | G01J 5/0803 250/339.01 |
| 2015/0108511 A1 | 4/2015 | Illek | |
| 2016/0197452 A1* | 7/2016 | Mor | H01S 5/423 359/569 |
| 2016/0238855 A1* | 8/2016 | Kriman | G02B 5/1814 |
| 2018/0101016 A1 | 4/2018 | Enzmann et al. | |
| 2019/0199052 A1* | 6/2019 | Miyoshi | H01S 5/02257 |
| 2019/0310541 A1* | 10/2019 | Zhang | G02B 27/4272 |

FOREIGN PATENT DOCUMENTS

| | | |
|---|---|---|
| CN | 204577824 U | 8/2015 |
| CN | 108594393 A | 9/2018 |
| DE | 102011050450 A1 | 11/2012 |
| DE | 102013103226 A1 | 10/2014 |
| DE | 102014000487 A1 | 7/2015 |
| DE | 102014118449 A1 | 6/2016 |
| DE | 102017100997 A1 | 7/2018 |
| DE | 102017112235 A1 | 12/2018 |
| DE | 102017119778 A1 | 2/2019 |
| DE | 102018129575 A1 | 5/2020 |
| JP | 2003029014 A | 1/2003 |
| WO | 00/60711 A1 | 10/2000 |
| WO | 02/093696 A2 | 11/2002 |
| WO | 2018147963 | 8/2018 |
| WO | 2018193026 A1 | 10/2018 |
| WO | 2018220062 A2 | 12/2018 |

OTHER PUBLICATIONS

International Search Report (with English Translation) and Written Opinion in corresponding International Application No. PCT/EP2020/054644 mailed on May 20, 2020, 15 pages.

\* cited by examiner

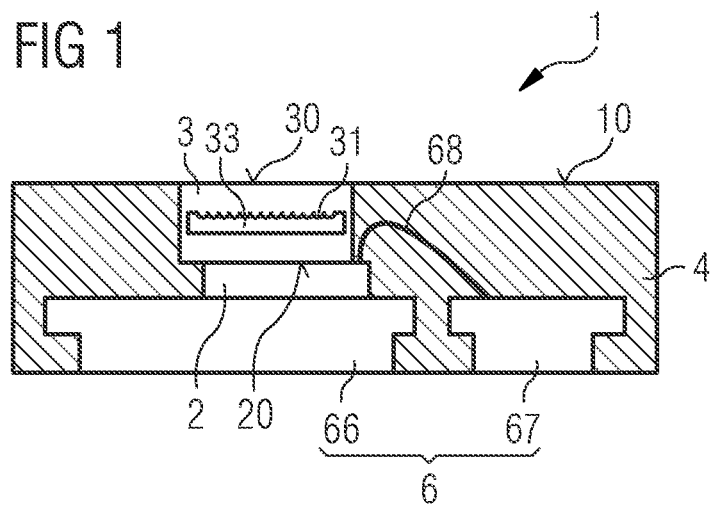
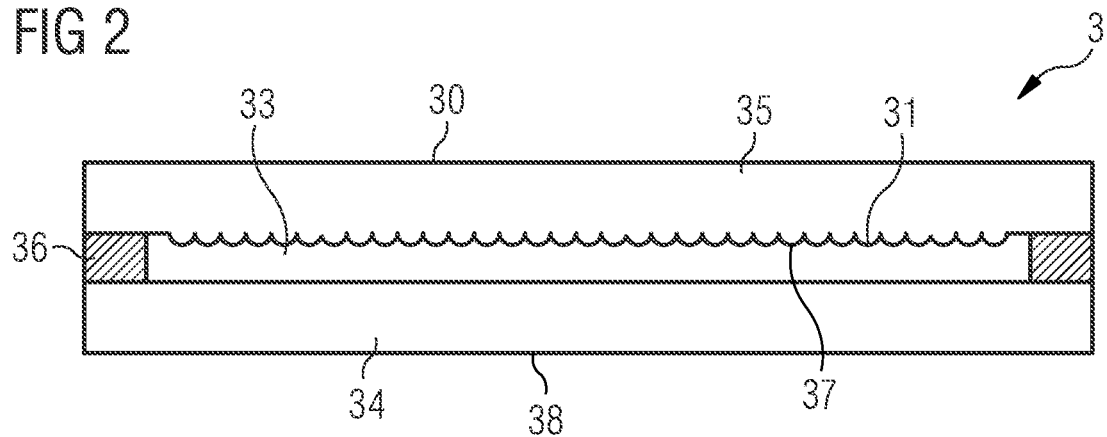
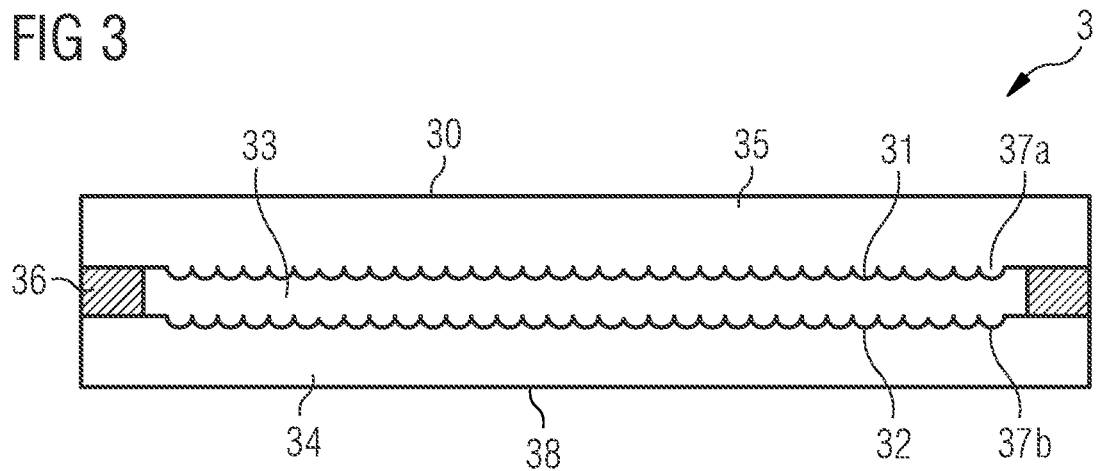

OPTOELECTRONIC SEMICONDUCTOR COMPONENT AND METHOD FOR PRODUCING AN OPTOELECTRONIC SEMICONDUCTOR COMPONENT

CROSS-REFERENCE TO RELATED APPLICATIONS

This patent application is a national stage entry from International Application No. PCT/EP2020/054644, filed on Feb. 21, 2020, published as International Publication No. WO 2020/173830 A1 on Sep. 3, 2020, and claims priority under 35 U.S.C. § 119 from German patent application 10 2019 104 986.5, filed Feb. 27, 2019, the entire contents of all of which are incorporated by reference herein.

FIELD OF THE INVENTION

An optoelectronic semiconductor device is specified. In addition, a method for producing an optoelectronic semiconductor device is specified.

BACKGROUND OF THE INVENTION

In the document US 2018/0101016 A1, a diffractive optical element is specified which is arranged downstream of a surface-emitting laser and which is used in combination with a potting material.

An object to be solved is to specify an optoelectronic semiconductor device which comprises a high efficiency and which is eye-safe.

This object is solved inter alia by an optoelectronic semiconductor device and by a method with the features of the independent patent claims. Preferred further developments are the subject of the remaining claims.

SUMMARY OF THE INVENTION

According to at least one embodiment, the optoelectronic semiconductor device comprises one or more optoelectronic semiconductor chips. The at least one semiconductor chip is provided for emitting radiation. For example, the semiconductor chip is a laser diode chip. Alternatively, light emitting diode chips may be used. For example, the semiconductor chip is configured to generate visible light, near-infrared radiation, and/or near-ultraviolet radiation.

The semiconductor layer sequence comprises at least one active zone which, in operation, is configured to generate radiation by means of electroluminescence. The semiconductor layer sequence is preferably based on a III-V compound semiconductor material. The semiconductor material is, for example, a nitride compound semiconductor material such as $Al_n In_{1-n-m} Ga_m N$ or a phosphide compound semiconductor material such as $Al_n In_{1-n-m} Ga_m P$ or also an arsenide compound semiconductor material such as $Al_n In_{1-n-m} Ga_m As$ or such as $Al_n Ga_m In_{1-n-m} As_k P_{1-k}$, wherein in each case $0 \leq n \leq 1$, $0 \leq m \leq 1$ and $n+m \leq 1$ as well as $0 \leq k < 1$. Preferably, for at least one layer or for all layers of the semiconductor layer sequence, $0 < n \leq 0.8$, $0.4 \leq m 23 1$ and $n+m \leq 0.95$ as well as $0 < k \leq 0.5$. In this context, the semiconductor layer sequence may comprise dopants as well as additional components. However, for simplicity, only the essential constituents of the crystal lattice of the semiconductor layer sequence, i.e., Al, As, Ga, In, N, or P, are specified, even though these may be partially replaced and/or supplemented by small amounts of additional substances.

According to at least one embodiment, the optoelectronic semiconductor device comprises at least one optical element. The optical element or elements are arranged downstream of the at least one semiconductor chip. If a plurality of semiconductor chips are present, a plurality of optical elements may also be present and may be associated with the semiconductor chips, for example, in a one-to-one correspondence. Alternatively, an optical element may be assigned jointly to a plurality of semiconductor chips.

According to at least one embodiment, the semiconductor device comprises a potting body. The at least one semiconductor chip and the at least one optical element are embedded in the potting body. The potting body may be transmissive or reflective to the radiation to be generated, in particular diffusely reflective. Furthermore, it is possible that the potting body has a radiation-absorbing effect to reduce scattered radiation.

According to at least one embodiment, the optical element comprises a structured, contiguous and optically effective area. In particular, the optical element is a diffractive optical element, or DOE, or a microlens array. Structural sizes of the optically effective area are, for example, in the range of the wavelength of the radiation to be emitted.

If the optical element is an optic made of a metamaterial, the structure sizes can be significantly smaller than the wavelength. For example, a metamaterial comprises a negative refractive index. In the case of a microlens array for the optical element, the structure sizes are in particular at least five times or ten times and/or at most one hundred times or twenty times the wavelength. The wavelength means in particular the vacuum wavelength of maximum intensity of the emitted radiation.

In particular, the optical element can be approximately understood as a plane-parallel structure. That is, in the optically effective area a structuring is present only on a small length scale, whereas averaged over many of the structural elements of the optical element the optically effective area can be approximated by a plane. That is, the optical element is not a macroscopically curved lens such as a convex lens or a concave lens.

Alternatively, the optical element may comprise a hybrid structure, composed of small, mean flat structures and of a macroscopic structure. For example, the optical element is composed of a microlens array and a converging lens. This has the purpose of optically influencing different areas of, for example, a VCSEL in different ways, for example in terms of a combination of a proximity sensor and a distance sensor, also referred to as a time of flight sensor or ToF for short.

According to at least one embodiment, the optically effective area is located inside the optical element. It is possible that external surfaces of the optical element are not configured for beam shaping and/or scattering of the radiation to be emitted.

According to at least one embodiment, the optical effective area is located directly at an optical contrast region, in particular at an evacuated cavity or at a gas-filled cavity. The optical contrast region may also be designed from a highly refractive material. That is, the optical contrast region, in particular the cavity, is preferably located within the optical element and forms an interface towards the optically effective area. Gas-filled means air-filled, for example, but can also mean gas-filled with an inert gas such as argon or nitrogen. A refractive index difference between the optical contrast region and the optically effective area is at least 0.3 or 0.4 or 0.6 or 0.75 and/or at most 1.5 or 1.0 or 0.8 at the wavelength of maximum intensity and at a temperature of 300 K. The optical contrast region is preferably homogeneously formed of a single material, but may also be a metamaterial, for example a matrix material with particles embedded therein for adjusting the refractive index.

According to at least one embodiment, the optically effective area predominantly or, preferably, completely covers a radiation exit area of the semiconductor chip. This applies in particular as seen in plan view of the radiation exit area. The radiation exit area is oriented, for example, perpendicular to a growth direction of the semiconductor layer sequence of the semiconductor chip. In particular, in this case the semiconductor chip is a surface emitting laser diode chip with a vertical cavity, in English Vertical Cavity Surface Emitting Laser, in short VCSEL.

In at least one embodiment, the optoelectronic semiconductor device comprises an optoelectronic semiconductor chip for emitting radiation. An optical element is optically disposed downstream of the semiconductor chip. The semiconductor chip and the optical element are embedded in a potting body. The optical element comprises a structured, contiguous and optically effective area which is located inside the optical element directly at an optical contrast region, in particular at an evacuated or gas-filled cavity. The optically effective area completely covers a radiation exit area of the semiconductor chip.

An attachment of an optical element to a package for an optoelectronic component is usually a thermomechanical weak point of such a device and can pose an eye safety problem, especially when using VCSEL chips or other laser diode chips. In the semiconductor device described here, it is possible to reliably attach the optical element to the semiconductor chip by embedding the semiconductor chip and the optical element together in the potting body.

When an optical element is used for an optoelectronic device, the functionality of which requires an air gap or an evacuated region between a radiation source, in particular a chip surface, and an optical element, the optical element is usually mounted on an upper side of the package, for example by adhesive bonding. To ensure the reliability of the adhesive bonding, a considerable effort is required for the design of the bonding surface and with regard to the choice of materials. Nevertheless, a permanent eye-safe, sufficiently stable attachment is associated with technical challenges.

These difficulties can be overcome with the optoelectronic semiconductor device described here. For this purpose, the semiconductor device comprises an encapsulated optical element which contains the air gap or evacuated region necessary for its function. A mounting of the optical element preferably takes place directly on the radiation exit area. The stack consisting of the optical element and of the semiconductor chip can be accommodated in a potting body or, for example, the stack is encapsulated with a transparent material or the stack is encapsulated with an opaque material, wherein the radiation exit area remains free.

Due to the encapsulated optical element, the functionality of the optical element is also maintained in the potting body, wherein the optically effective area is protected from scratches and damage. By mounting the optical element in particular directly on the radiation exit area, it can be kept small. This enables cost savings and wafer-level or panel-level processes. In addition, this enables technically efficient mounting of the optical element, precise alignment of the optical element relative to the semiconductor chip, and compact, space-saving designs. By encapsulating the complete stack of the optical element and the semiconductor chip, a high mechanical load capacity can be achieved. In particular, the optical element cannot be separated from the semiconductor chip without destroying a housing of the semiconductor device and thus the semiconductor device itself.

According to at least one embodiment, the semiconductor chip and the optical element are form-fitted laterally all around and directly surrounded by the potting body. That is, side surfaces of the semiconductor chip and the optical element may be directly partially or predominantly or completely covered by the potting body. In particular, there is no bonding agent such as an adhesive layer between the semiconductor chip and the optical element on the one hand and the potting body on the other hand.

According to at least one embodiment, the potting body and the optical element are flush with each other in the direction away from the semiconductor chip. That is, the optical element remains free of the potting body at a light exit side. The potting body and the optical element may form a device front side. The device front side is preferably flat and planar in shape. Alternatively, it is possible for the potting body to taper in a lateral direction away from the optical element, for example due to thickness shrinkage or capillary effects when creating the potting body.

Alternatively, the potting body may protrude beyond the optical element or the optical element may protrude from the potting body such that side surfaces of the optical element are only partially covered by the potting body.

According to at least one embodiment, the optical element comprises a base plate and a cover plate. The base plate is located between the semiconductor chip and the cover plate.

Both the base plate and the cover plate are preferably made of a material that is transparent to the radiation to be emitted, for example a glass or also a plastic. Furthermore, the cover plate and/or the base plate may be made of a light-transmissive material such as sapphire. Preferably, the cover plate and/or the base plate comprise a high optical refractive index of at least 1.6 or 1.7 or 1.8 or 2.0.

According to at least one embodiment, the base plate and the cover plate are connected to each other by means of a frame and/or by means of a spacer. In particular, the optical contrast region, especially the cavity, is defined by the base plate together with the cover plate and the frame.

According to at least one embodiment, the optical contrast region, in particular the cavity, is tightly enclosed by the base plate, the cover plate and the frame. That is, in the intended use of the semiconductor device, no or no significant gas exchange takes place between the optical contrast region, in particular the cavity, and an external region. The optical contrast region can thus be hermetically sealed. In particular, the optical contrast region is so tightly enclosed due to the base plate, the cover plate and the frame that no material for the potting body enters the area intended for the optical contrast region when the potting body is created. That is, an inner region of the optical element may be free of the material for the potting body.

According to at least one embodiment, the base plate and/or the cover plate comprise planar, flat outer sides. That is, on outer sides, in particular on main surfaces formed by the base plate and/or the cover plate, the optical element is free of optically effective structures, in particular free of lens shapes or surface structuring.

It is possible that the optical element is provided with a structuring such as a roughening in regions that are not intended for beam guiding or beam shaping. For example, side surfaces of the base plate and/or cover plate and/or frame are provided with a roughening and/or indentations and/or protrusions to achieve more efficient interlocking and better mechanical retention in the potting body.

According to at least one embodiment, the optically effective area is limited to an inner surface of the cover plate. That is, the optical element may comprise a single optically effective area. Alternatively to the cover plate, the optically effective area may be provided on an inner side of the base plate.

According to at least one embodiment, the optical element comprises a further optically effective area in addition to the optically effective area. Preferably, the further optically effective area is also a continuous, structured surface which can partially, predominantly or completely cover the radiation exit area. A structuring of the further optically effective area can be designed in the same way as for the optically effective area or represent a negative to the optically effective area, or can also be structured independently of the optically effective area.

According to at least one embodiment, the optically effective area and the further optically effective area are the only surfaces of the optical element that are structured and intended for an optical effect. Preferably, these two surfaces are formed by inner sides of the base plate as well as the cover plate. That is, all surfaces of the optical element intended for an optical effect are then located inside the optical element. In particular, the optically effective area and the further optically effective area each adjoin the optical contrast region, in particular the evacuated or gas-filled cavity, over the entire surface and directly.

According to at least one embodiment, outer sides of the frame are predominantly or completely and/or directly covered by the potting body. In this case, the frame can be flush with the cover plate and/or with the base plate.

Alternatively, the frame may project outwardly beyond the base plate and/or the cover plate or may be recessed relative to the base plate and/or the cover plate. By means of corresponding designs of the frame, a reinforced interlocking of the optical element with the potting body can be realized, so that the optical element and the potting body are reliably mechanically coupled to each other.

According to at least one embodiment, a protective cover is jointly arranged downstream of the potting body and the optical element. The protective cover is, for example, a plate, a film or a varnish layer. For example, the protective cover is made of a glass or a plastic. The protective cover may comprise a greater hardness than the potting body, which is formed, for example, from a comparatively soft material such as a silicone or an epoxy.

According to at least one embodiment, the protective cover forms the device front side of the semiconductor device. In particular, the entire device front side may be formed solely from the protective cover. Preferably, the protective cover is clear transparent and thus does not have a scattering effect for the radiation to be emitted. It is possible that the protective cover comprises a dye, wherein this dye preferably does not absorb or does not absorb significantly in the spectral range of the radiation to be emitted. An external impression of the semiconductor device can be adjusted via such dyes.

According to at least one embodiment, the protective cover is arranged immediately downstream of the potting body and the optical element. This may mean that the protective cover contacts the potting body and/or the optical element.

Alternatively, there is only a bonding agent such as an adhesive between the potting body and the optical element on the one hand and the protective cover on the other hand.

In this case, a distance between the protective cover and the optical element is preferably at most 10 µm or 5 µm or 2 µm. That is, any bonding agent present is only thinly configured.

The protective cover itself is preferably relatively thin. In particular, a thickness of the protective cover is at least 10 µm or 50 µm or 0.1 mm and/or at most 1 mm or 0.5 mm or 0.1 mm.

According to at least one embodiment, the optical element is arranged spaced apart from the semiconductor chip. That is, the optical element does not contact the semiconductor chip.

In this case, a region between the radiation exit area and the optical element is preferably completely filled by the potting body. That is, the potting body may form a contiguous, gap-free and continuous layer extending between the radiation exit area and the optical element.

According to at least one embodiment, the optical element is directly attached to the semiconductor chip. This may mean that the optical element contacts the radiation exit area in places or over the entire surface. For example, the base plate of the optical element is designed as an attachment frame for the semiconductor chip. By means of such an attachment frame, it can be achieved that no material of the potting body penetrates between the optical element and the radiation exit area.

Alternatively, it is possible that the optical element is attached to the radiation exit area by means of a bonding agent, such as a silicone-based adhesive. In this case, a distance between the radiation exit area and the optical element is preferably at most 10 µm or 5 µm or 2 µm, so that a corresponding bonding agent layer is only thinly configured.

According to at least one embodiment, the optical element is a diffractive optical element or also a multi-lens array. An average structure size of optically effective structures of the optically effective area is preferably at least 50 nm or 0.1 µm or 0.2 µm. Alternatively or additionally, the structure size is at most 0.1 mm or 20 µm or 5 µm or 2 µm or 1 µm.

According to at least one embodiment, the optically active structures of the optical element are arranged regularly on the optically active surface. Regular means, for example, a regular pattern or a pattern calculated in advance to ensure eye safety. Alternatively, it is possible that the structures are arranged and/or distributed irregularly and/or randomly and form, for example, a roughening.

According to at least one embodiment, the optical element is large compared to the radiation exit area. For example, the optically effective area is larger than the radiation exit area or than the semiconductor chip by at least a factor of 1.2 or 1.5 or 2 with respect to its lateral extent. That is, the semiconductor chip can be located completely within the optically effective area when viewed from above the radiation exit area. Such a design can prevent parts of the radiation to be emitted from hitting the frame or side surfaces of the optically effective element.

Alternatively, the optical element and/or the optically effective area is approximately as large as the radiation emitting area. For example, the size of the optically effective area is at least 90% or 100% and/or at most 120% or 110% of the area of the radiation exit area.

According to at least one embodiment, the semiconductor device comprises one or more carriers. The semiconductor chip and the potting body are attached to the at least one carrier. The carrier may be the component mechanically carrying and supporting the semiconductor device in addition to or alternatively to the potting body. Preferably, an electrical connection of the semiconductor device is provided via the carrier, so that the carrier may have electrical contact regions.

According to at least one embodiment, the carrier comprises a plurality of electrical contact vias. The vias may be located in an interior of the carrier or at an edge of the carrier. Via the vias, electrical contact regions on a front side of the carrier where the semiconductor chip is located are electrically connected to electrical contact regions on a rear side of the carrier. The carrier rear side may form a mounting surface of the semiconductor device. The carrier is, for example, a printed circuit board or PCB. Such designs may also be referred to as chip-LEDs.

According to at least one embodiment, the semiconductor device comprises a plurality of lead frame parts. Such lead frame parts may form a carrier. For example, the semiconductor chip is mounted on a first of the lead frame parts and electrically connected with a second lead frame part, for example by means of a bonding wire. Alternatively, it is possible that the semiconductor chip is designed as a flip chip and is applied electrically and mechanically directly to two or more than two lead frame parts. Such designs may also be referred to as ODQFN.

According to at least one embodiment, the lead frame parts are mechanically connected to each other exclusively by means of the potting body. An electrical connection, for example between the semiconductor chip and another lead frame part, implemented via a bonding wire, or a connection of the lead frame parts by means of the semiconductor chip itself is not regarded as a mechanically stable connection. The potting body can be flush or approximately flush with undersides of the lead frame parts facing away from the semiconductor chip.

According to at least one embodiment, the semiconductor device comprises a plurality of lead frame portions and a housing base body. The semiconductor chip is mounted on at least one of the lead frame portions and optionally electrically connected with a second of the lead frame portions. Alternatively, the semiconductor chip may in turn be electrically mounted directly on both lead frame portions or electrically connected to a plurality of lead frame portions via a plurality of bonding wires. The lead frame parts are mechanically connected to each other by means of the housing base body. Such a design may also be referred to as a QFN package or premolded package.

According to at least one embodiment, the semiconductor chip and/or the potting body are located in a recess of the housing base body. Preferably, the optical element is located in the recess, in particular completely in the recess. The recess can be flush with the optical element or the optical element can be sunk in the recess.

According to at least one embodiment, the semiconductor device is surface mountable. That is, by means of SMT, the semiconductor device is attachable to an external carrier.

According to at least one embodiment, the optical element is oriented parallel to a mounting side of the semiconductor device. Viewed in cross-section, the semiconductor device in this case preferably comprises a rectangular basic shape.

According to at least one embodiment, the only region within the semiconductor device through which the radiation emitted by the semiconductor chip passes and which is not formed by condensed matter is the cavity. That is, except for the cavity, the semiconductor device may be completely filled with liquid or, preferably, solid matter, particularly in the beam path of the radiation to be emitted.

According to at least one embodiment, at least 90% or 95% or 98% or even all of the radiation emitted by the semiconductor chip in operation passes through the optically effective area and/or the further optically effective area. Thus, it can be ensured that the semiconductor device is eye-safe due to the optical element.

Furthermore, a method for producing optoelectronic semiconductor devices is specified. In particular, a semiconductor device as described in connection with one or more of the above embodiments is produced by the method. Features of the semiconductor device are therefore also disclosed for the method, and vice versa.

In at least one embodiment, the method comprises the following steps, in particular in the order indicated:
providing a carrier,
attaching the semiconductor chip to the carrier,
placing the optical element on or to the semiconductor chip, and
producing the potting body.

According to at least one embodiment, the potting body is generated by film assisted injection molding or transfer molding, also referred to as film assisted molding or FAM for short. This efficiently allows the optical element and the potting body to be flush with each other in the direction away from the semiconductor chip.

Instead of using FAM, the potting body can also be produced by an alternative manufacturing process such as casting.

In the following, an optoelectronic semiconductor device described herein and a method described herein are explained in more detail with reference to the drawing by means of exemplary embodiments. Like reference signs thereby specify like elements in the individual figures. However, no references to scale are shown; rather, individual elements may be shown exaggeratedly large for better understanding.

BRIEF DESCRIPTION OF THE DRAWINGS

In the Figures:
FIG. 1 shows a schematic sectional view of an exemplary embodiment of an optoelectronic semiconductor device described herein,
FIGS. 2 and 3 show schematic sectional views of exemplary embodiments of optical elements for optoelectronic semiconductor devices described herein.

DETAILED DESCRIPTION

Figure 4:
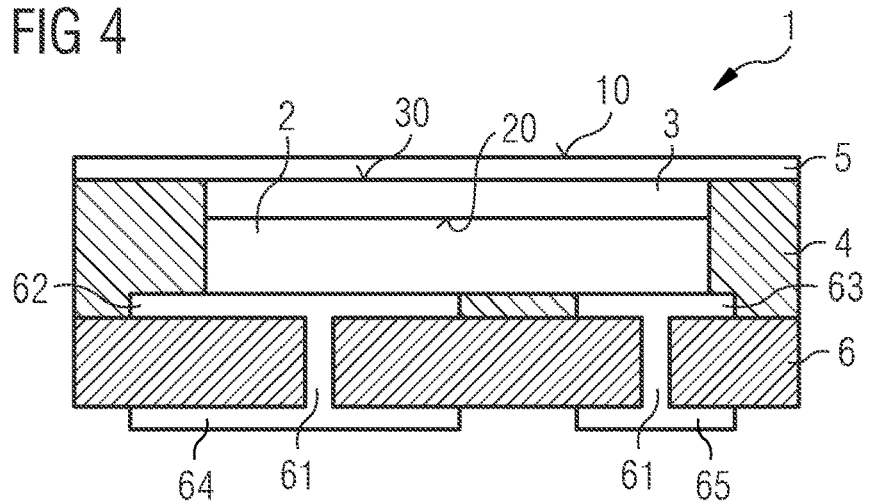
FIGS. 4 to 10 show schematic sectional views of exemplary embodiments of optoelectronic semiconductor devices described herein.

FIG. 1 illustrates an exemplary embodiment of an optoelectronic semiconductor device 1. The semiconductor device 1 comprises an optoelectronic semiconductor chip 2. The semiconductor chip is, for example, a surface emitting laser diode with a vertical cavity, in short VCSEL.

Furthermore, the semiconductor device 1 comprises an optical element 3. The optical element 3 is a multi-lens array or a diffractive optical element, in short DOE. The optical element 3 is located at a radiation exit side 20 of the semiconductor chip 2. An optical contrast region, in particular a cavity 33, is located inside the optical element 3. A light exit side 30 of the optical element 3 faces away from the radiation exit side 20 and completely covers it. Instead of a cavity 33, as in all other exemplary embodiments, a region with a large optical refractive index relative to the base plate and/or relative to the cover plate may be used.

A refractive index jump between the optical contrast region 33 and the optically effective area 33 is preferably at least 0.4 or at least 0.5.

The semiconductor chip 2 is mounted on a lead frame portion 66 and electrically connected to another lead frame portion 67 via a bonding wire 68. The lead frame parts 66, 67 form a carrier 6. The lead frame parts 66, 67 are preferably metallic, in particular made of a copper sheet.

Furthermore, the semiconductor device 1 comprises a potting body 4. The potting body 4 is, for example, made of an absorbent material that is nontransmissive to radiation to be emitted by the semiconductor device 1 during operation. For example, the potting body 4 is made of an epoxy to which carbon black particles may be added as a colorant.

The lead frame parts 66, 67 are mechanically firmly connected to each other via the potting body 4. For better embedding in the potting body 4, the lead frame parts 66, 67 may comprise anchoring structures. Furthermore, the bonding wire 68 is embedded in the potting body 4.

A stack formed by the semiconductor chip 2 and the optical element 3 is integrated in the potting body. In this case, the potting body 4 is formed in a form-fitting manner and on side surfaces all around directly to the semiconductor chip 2 and the optical element 3. The radiation exit area 20 and the light exit side 30 are free from the potting body 4.

In the direction away from the semiconductor chip 2, the potting body 4 is flush with the light exit side 30 at a device front side 10. That is, the potting body 4 together with the optical element 3 forms the planar, flat device front side 10.

Such a design of the semiconductor device 1 can be achieved, for example, by means of film-assisted injection molding or transfer molding, or FAM for short. In this process, a sealing film is applied to the lead frame parts 66, 67 and to the optical element 3 in a potting mold, the sealing film being pressed on by means of an injection tool, not drawn. Subsequently, material for the potting body 4 is filled in, which can be flush with the optical element 3 and with the lead frame parts 66, 67. After removal from the injection mold or transfer mold and removal of the foils, the result is the design shown in FIG. 1.

In FIG. 2, an exemplary embodiment of the optical element 3 is illustrated in more detail. The optical element 3 comprises a base plate 34 and a cover plate 35. The cover plate 35 and the base plate 34 are, for example, glass plates and approximately plane-parallel. The cover plate 35 is provided with an optically effective area 31. The optically effective area 31 is formed of a plurality of optically effective structural elements 37. The structural elements 37 may be microlenses.

Lateral dimensions of the structural elements 37 are, for example, of the order of 1 µm. By means of the structural elements 37 and thus by means of the optically effective area 31, it is achieved that the laser radiation emitted by the semiconductor chip 2 during operation is sufficiently scattered and expanded so that eye safety of the semiconductor device 1 is ensured. Furthermore, the structural elements 37 can prevent so-called speckle patterns and interference-related intensity excesses in a radiation pattern.

The base plate 34 and the cover plate 35 are separated from each other by a frame 36 as a spacer. The frame 36 is made of a semiconductor material or a metal, for example, but can also be made of a glass material such as a glass solder. Enclosed by the two plates 35, 34 and the frame 36 is the cavity 33. The cavity 33 is preferably gas-filled, for example with air or with an inert gas such as nitrogen. The optically effective area 31 is directly adjacent to the cavity 33 to ensure a sufficiently high refractive index jump. In particular, to increase the refractive index jump, the cover plate 35 can also be made of a material with a high refractive index, for example sapphire.

FIG. 3 illustrates another exemplary embodiment of the optical element 3. In contrast to FIG. 2, a further optically effective area 32 is present on the base plate 34. Structural elements 37a of the optically effective area 31 and structural elements 37b of the further optically effective area 32 may be of different or identical design.

An average thickness of the cavity 33 is, for example, at least 5 µpm or 10 µm or 0.1 mm. Alternatively or additionally, this average thickness of the cavity 33 is at most 1 mm or 0.5 mm or 0.1 mm. Averaged over the structural elements 37, 37a, 37b, the cavity 33 is a plane-parallel gap. An average height of the structural elements 37, 37a, 37b is preferably small compared to the average thickness of the cavity 33. That is, for example, the average thickness is larger than the average height of the structural elements 37, 37a, 37b by at least a factor of 2 or 5 and/or by at most a factor of 100 or 20. These values may also apply to all other exemplary embodiments.

The optically effective areas 31, 32 are extended so far in the lateral direction that the entire radiation exit area 20 of the associated semiconductor chip 2 is covered in each case. This ensures that substantially all the radiation emitted by the semiconductor chip 2 passes through the optically effective area 31 and optionally the further optically effective area 32.

The optical elements 3, as illustrated in FIGS. 2 and 3, can be used in all exemplary embodiments of the semiconductor device 1.

In the exemplary embodiment of FIG. 4, the carrier 6 is formed by a printed circuit board, for example a PCB or a ceramic board, which is provided with electrical contact regions 62, 63, 64, 65. The semiconductor chip 2 is mounted on the two contact regions 62, 63 on a front side of the carrier. An assembly of the semiconductor chip 2 can be performed without bond wires. For example, the semiconductor chip 2 is a flip chip.

The contact regions 62, 63 are connected via electrical contact vias 61 with electrical contact regions 64, 65 on a carrier rear side. There may be a plurality of vias 61 per pair of contact regions, other than as shown in FIG. 4. Thus, the semiconductor device 1 is surface mountable.

The optical element 3 is again flush with the potting body 4, in the direction away from the carrier 6. The semiconductor chip 2 as well as the optical element 3 are thus surrounded all around by the potting body 4.

In the lateral direction, the semiconductor chip 2 and the optical element 3 can also be flush with each other. Thus, as seen in plan view of the device front side 10, the optical element 3 and the semiconductor chip 2 can be congruent or approximately congruent.

Optionally, as is also possible in all other exemplary embodiments, a protective cover 5 is provided. The device front side 10 may be completely formed by the protective cover 5. Thus, the protective cover 5 completely covers the optical element 3 as well as the potting body 4. For example, the protective cover 5 is a scratch-resistant, plane-parallel glass plate which is attached directly to the optical element 3 or which is glued on.

Figure 5:
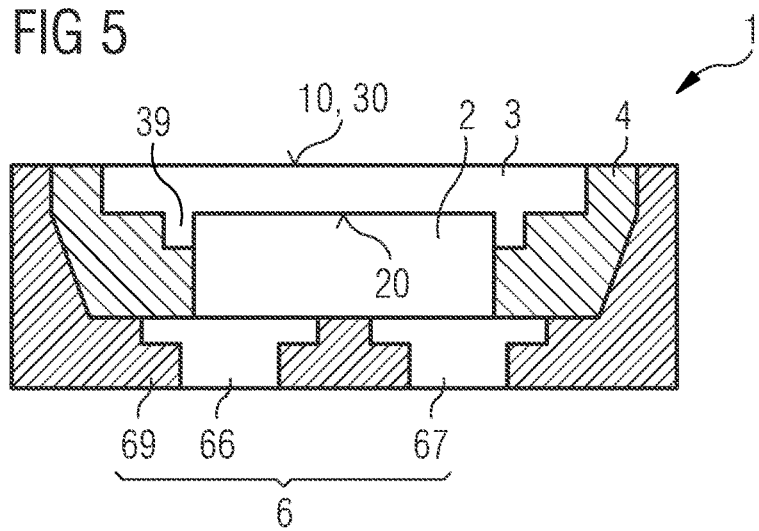

In the exemplary embodiment of FIG. 5, it is illustrated that the housing 6 additionally comprises a housing base body 69 in addition to the lead frame parts 66, 67. The housing base body 69 is, for example, made of an opaque material such as an epoxy and may be, for example, white in color.

The semiconductor chip 2, the optical element 3 and the potting body 4 are located in a recess of the housing base body 69. The potting body 4 and optionally also the optical element 3 can be flush with the recess.

Furthermore, it is illustrated in FIG. 5 that the optical element 3 comprises a significantly larger lateral extension than the semiconductor chip 2. This ensures that the radiation to be emitted is not reflected undefined at side surfaces of the optical element 3.

Optionally, as in all other exemplary embodiments, the optical element 3 may comprise an attachment frame 39 on a side facing the semiconductor chip 2. With such an attachment frame 39, it is possible for the optical element 3 to be applied directly to the radiation exit area 20 without using any compound. By means of the attachment frame 39, a seal against material of the potting body 4 can be achieved. Thus, the radiation exit area 20 can remain completely free of the potting body 4.

The potting body 4 is formed, for example, from a transparent, clear silicone. The same is possible in all other exemplary embodiments.

Figure 6:
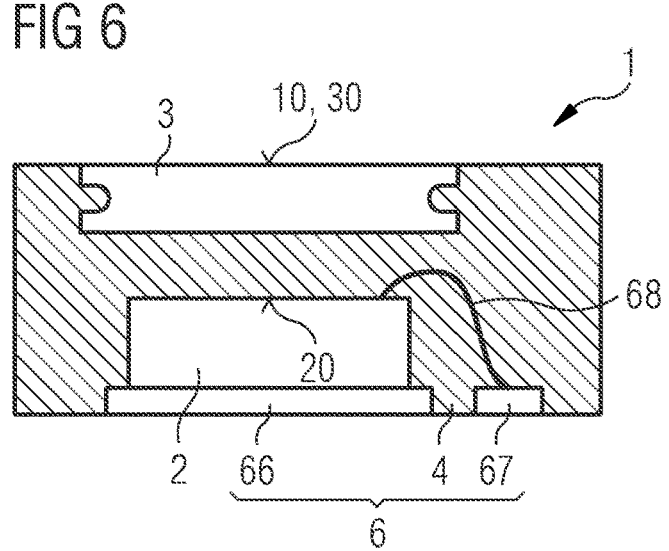

In FIG. 6, it is shown that the radiation-transmissive potting body 4 completely occupies an area between the optical element 3 and the radiation exit area 20. That is, the optical element 3 is arranged at a distance from the semiconductor chip 2. For example, a distance between these components 2, 3 is at least 0.1 mm or 0.2 mm and/or at most 2 mm or 1 mm or 0.5 mm.

As in all exemplary embodiments, it is possible that the optical element 3 comprises anchoring structures at an edge, for example formed by indentations. Via such anchoring structures, an improved adhesion to the potting body 4 is formed, so that delamination of the optical element 3 from the potting body 4 can be efficiently prevented. Instead of indentations or also protrusions, the optical element 3 can be provided, in particular only on its side surfaces, with a roughening, not drawn.

Figure 7:
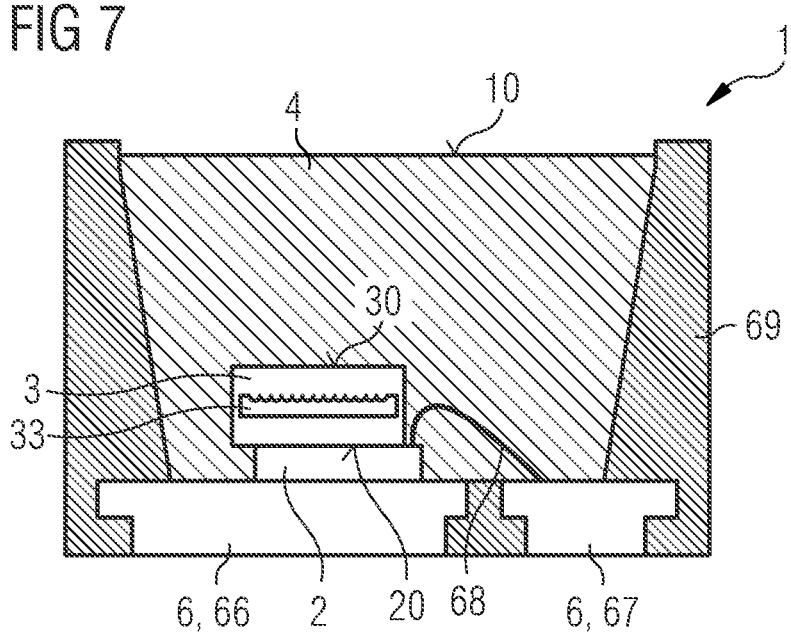

In the exemplary embodiment of FIG. 7 it is illustrated that the optical element 3 is slightly offset laterally with respect to the semiconductor chip 2, wherein the radiation exit area 20 is still completely covered by the optical element 3. Through this, space for a bonding wire contact is achieved at a side edge of the semiconductor chip 2. Alternatively, the optical element 3 may comprise a cutout for the at least one bonding wire, as is also possible in all other exemplary embodiments.

Furthermore, the optical element 3 is completely covered by the potting body 4 at the light exit side 30. This ensures improved embedding of the optical element 3 in the potting body 4. The recess in the housing base body 69 need not be completely filled with the potting body 4.

In all other respects the explanations to FIG. 5 apply accordingly.

Figure 8:
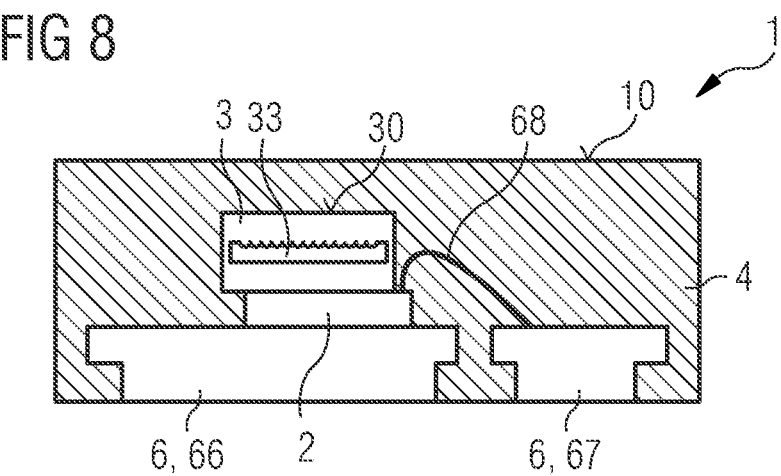

The semiconductor device 1 shown in FIG. 8 also comprises a potting body 4 which completely covers the light exit side 30. The lead frame parts 66, 67 are mechanically held together by the radiation-transmitting potting body 4.

In all other respects the explanations to FIG. 1 apply accordingly.

Figure 9:
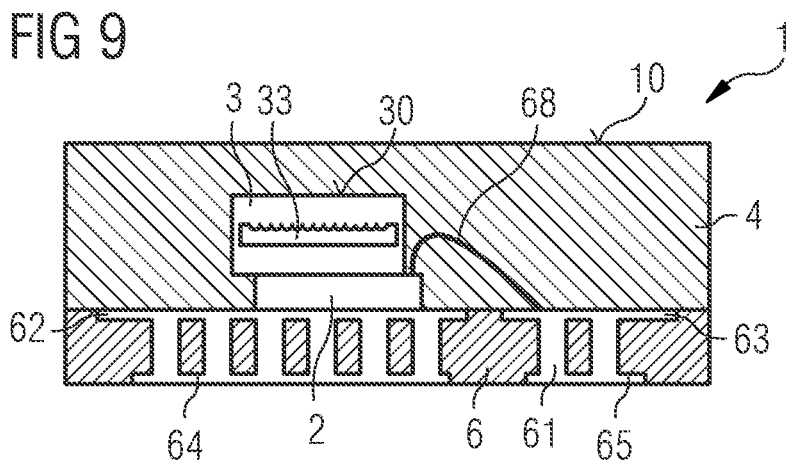

In the exemplary embodiment of FIG. 9, it is shown that the carrier 6 is formed by a printed circuit board, wherein several electrical contact surfaces 61 are provided via each pair of electrical contact regions. The potting body 4 completely covers the light exit side 30.

In addition, the explanations regarding FIG. 4 apply accordingly.

Figure 10:
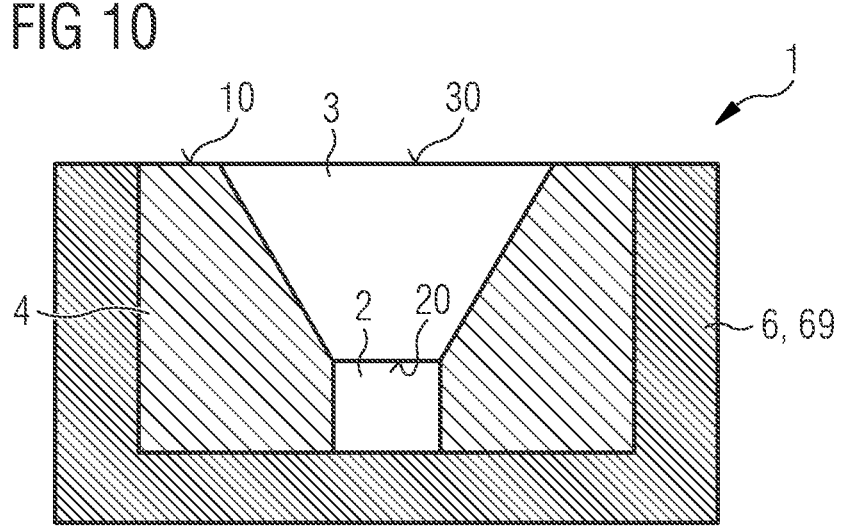

In the exemplary embodiment of the semiconductor device 1 of FIG. 10, the optical element 3 is truncated pyramid-shaped or truncated cone-shaped. Thus, the optical element 3 widens in the direction away from the semiconductor chip 2.

In addition, the explanations regarding FIGS. 1 and 5 in particular apply accordingly.

Figure 11:
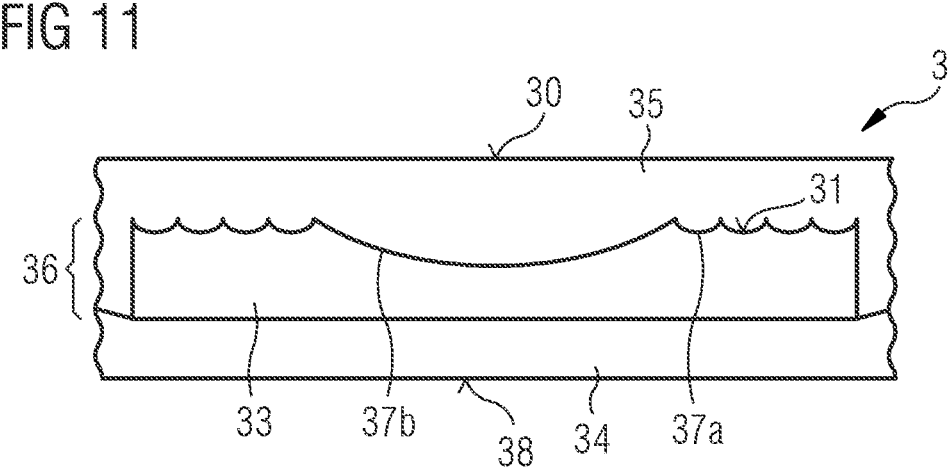
FIGS. 11 and 12 show schematic sectional views of exemplary embodiments of optical elements for optoelectronic semiconductor devices described herein.

The optical element 3 of FIG. 11 comprises two types of structural elements 37a, 37b at the optically effective area 31. The smaller structural elements 37a are designed as microlenses or also as diffractive optical structures or as metamaterial. In contrast, the larger structural element 37b, which is arranged centrally, for example, is a macroscopic lens such as a converging lens. Thus, different optical functions can be achieved in different areas of the optical element 3.

Optionally, the structural elements 37a are also present as substructures on the structural element 37b, in deviation from the illustration in FIG. 11. That is, also in the configuration of FIG. 11, the entire interface facing the cavity 33, in particular of the cover plate 35, can be provided with the structural elements 37a throughout.

The frame 36 may be integrated in the cover plate 35 and/or in the base plate 34 and formed integrally therewith. A roughening may be provided on side surfaces.

Figure 12:
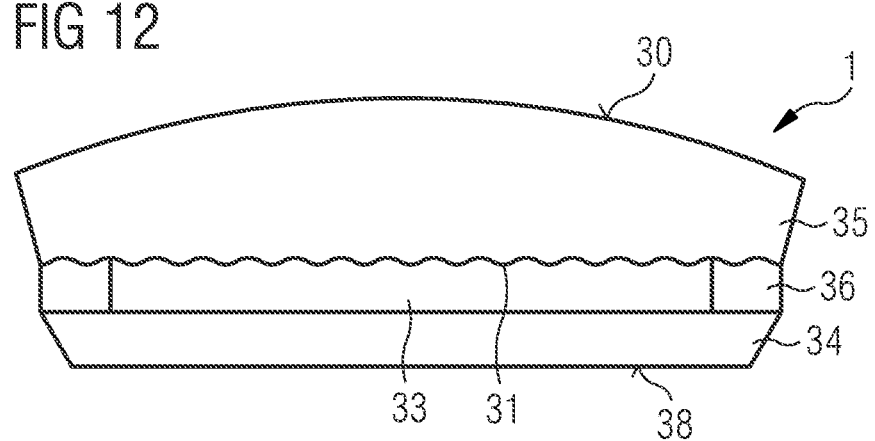

In FIG. 12, it is illustrated that the radiation exit area 30 is formed as a lens, particularly a converging lens. The optically effective area 31 is present continuously at the cavity 33.

The cover plate 35 and/or the base plate 34 may widen toward the radiation exit area 30. The frame 36 may comprise a constant width. The frame 36 on the cover plate 35 and on the base plate 34 may have a self-aligning design.

The optical elements 3 of FIGS. 11 and 12, or individual aspects thereof, may be used for all exemplary embodiments of the semiconductor device 1.

Figure 13:
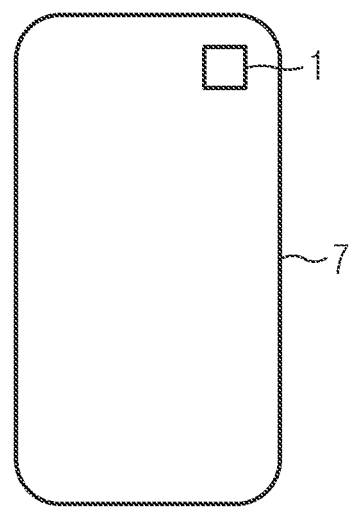
FIG. 13 shows a schematic top view of an appliance with an exemplary embodiment of an optoelectronic semiconductor device described herein.

FIG. 13 illustrates an appliance 7 comprising one or more of the semiconductor devices 1. The appliance 7 is in particular a smartphone. The semiconductor device 1 is used, for example, for distance measurement and is a radiation source for a ToF sensor.

Dimensions of the semiconductor device 1 are preferably at most 4×4×2 mm$^3$ or at most 2.5×2.5×1.5 mm$^3$.

As an alternative to a ToF sensor, semiconductor devices 1 described herein may serve, for example, in a smartphone, but also in other types of appliances, as a light source for a biometric sensor, as a flat light source for an illumination of a surface, as a light source for a driver monitoring, or as a light source, for example, for determining the position of a user in the context of a virtual or augmented reality system, in short VR or AR.

Unless otherwise indicated, the components shown in the figures preferably follow each other directly in the sequence indicated. Layers that do not touch in the figures are preferably spaced apart. Insofar as lines are drawn parallel to each other, the corresponding surfaces are preferably also aligned parallel to each other. Also, unless otherwise indicated, the relative positions of the drawn components to each other are correctly reproduced in the figures.

The invention described herein is not limited by the description based on the exemplary embodiments. Rather, the invention encompasses any new feature as well as any combination of features, which particularly includes any combination of features in the patent claims, even if that feature or combination itself is not explicitly specified in the patent claims or exemplary embodiments.

The invention claimed is:

1. An optoelectronic semiconductor device comprising:
   an optoelectronic semiconductor chip for emitting radiation,
   an optical element disposed optically downstream of the semiconductor chip, and
   potting body in which said semiconductor chip and said optical element are embedded,
   wherein
      the optical element comprises a structured, contiguous and optically effective area which is located inside the optical element directly at an optical contrast region, so that a refractive index jump of at least 0.4 is present between the optically effective area and the optical contrast region,
      the optically effective area completely covers a radiation exit area of the semiconductor chip, and
      the potting body directly surrounds the semiconductor chip and the optical element all around laterally in a form-fitting manner.

2. The optoelectronic semiconductor device according to claim 1,
   wherein
      the optical contrast region is an evacuated or gas-filled cavity,
      said semiconductor chip is a surface emitting laser diode, and
      the potting body and the optical element are flush with one another in a direction away from the semiconductor chip, so that the optical element remains free of the potting body on a light exit side.

3. The optoelectronic semiconductor device according to claim 1,
   wherein the optical element comprises a base plate and a cover plate and the base plate is located between the semiconductor chip and the cover plate,
   wherein the base plate and the cover plate are connected to each other by means of a frame so that the optical contrast region is tightly enclosed by the base plate, the cover plate and the frame, and
   wherein the base plate and the cover plate comprise planar outer surfaces.

4. The optoelectronic semiconductor device according to claim 3,
   wherein the optically effective area is limited to an inner side of the cover plate.

5. The optoelectronic semiconductor device according to claim 3,
   wherein an inner side of the base plate is provided with a continuous and structured further optically effective area, and
   wherein the optically effective area and the further optically effective area are the only areas of the optical element that are structured and intended for an optical effect.

6. The optoelectronic semiconductor device according to claim 3,
   wherein the outer side of the cover plate is a flat surface lying in a device front side,
   wherein outer sides of the frame are completely and directly covered by the potting body.

7. The optoelectronic semiconductor device according to claim 1,
   in which the potting body and the optical element are directly and jointly followed by a protective cover, so that the protective cover forms a device front side of the semiconductor device.

8. The optoelectronic semiconductor device according to claim 1,
   wherein the optical element is arranged spaced apart from the semiconductor chip, so that a region between the radiation exit area and the optical element is completely filled by the potting body.

9. The optoelectronic semiconductor device according to claim 1,
   wherein the optical element is directly attached to the radiation exit area such that a distance between the radiation exit area and the optical element is at most 5 µm.

10. The optoelectronic semiconductor device according to claim 1,
    wherein the optical element is a diffractive optical element or a multi-lens array such that an average structure size of optically effective structure elements of the optically effective area is between 0.1 µm and 2 µm inclusive, and
    wherein the structure elements are arranged regularly.

11. The optoelectronic semiconductor device according to claim 1,
    in which the optically effective area comprises a lateral extent greater than the semiconductor chip by at least a factor of 1.5, so that the semiconductor chip, as seen in plan view, lies completely within the optically effective area.

12. The optoelectronic semiconductor device according to claim 1, further comprising a carrier on which the semiconductor chip and the potting body are attached,
    wherein the carrier comprises a plurality of electrical contact vias such that electrical contact regions on a carrier front side with the semiconductor chip are electrically connected to electrical contact surfaces on a carrier rear side.

13. The optoelectronic semiconductor device according to claim 1, further comprising at least two lead frame parts,
    wherein the semiconductor chip is mounted on a first of the lead frame parts and electrically connected with a second of the lead frame parts, and
    wherein the lead frame parts are mechanically connected to each other exclusively by means of the potting body.

14. The optoelectronic semiconductor device according to claim 1, further comprising at least two lead frame parts and a housing base body,
    wherein the semiconductor chip is mounted on a first of the lead frame parts and electrically connected with a second of the lead frame parts,
    wherein the lead frame parts are mechanically connected to each other by means of the housing base body, and
    wherein the semiconductor chip, the optical element and the potting body are placed in a recess of the housing base body.

15. The optoelectronic semiconductor device according to claim 1, which is surface mountable,
    wherein the optical element is oriented parallel to a mounting side of the semiconductor device,
    wherein the only region within the semiconductor device through which the radiation emitted by the semiconductor chip passes and which is not formed by condensed matter is said cavity, and wherein at least 98% of the radiation emitted from the semiconductor chip passes through the optically effective area.

16. A method for producing the optoelectronic semiconductor device according to claim 1, the method comprising:
providing a carrier,
attaching the semiconductor chip on the carrier,
placing the optical element on the semiconductor chip, and
producing the potting body,
wherein the potting body is produced by film-assisted injection molding or transfer molding so that the optical element and the potting body are flush with each other in the direction away from the semiconductor chip.

17. An optoelectronic semiconductor device comprising:
an optoelectronic semiconductor chip for emitting radiation,
an optical element disposed optically downstream of the semiconductor chip, and
a potting body in which said semiconductor chip and said optical element are embedded,
wherein
the optical element comprises a structured, contiguous and optically effective area which is located inside the optical element directly at an optical contrast region, so that a refractive index jump of at least 0.4 is present between the optically effective area and the optical contrast region,
the optically effective area completely covers a radiation exit area of the semiconductor chip,
the potting body and the optical element are flush with one another in a direction away from the semiconductor chip, so that the optical element remains free of the potting body on a light exit side, and
the potting body directly surrounds the semiconductor chip and the optical element all around laterally in a form-fitting manner.

18. The optoelectronic semiconductor device according to claim 1,
wherein the potting body directly adjoins the optical element and the semiconductor chip.

* * * * *

UNITED STATES PATENT AND TRADEMARK OFFICE
CERTIFICATE OF CORRECTION

PATENT NO. : 12,442,921 B2
APPLICATION NO. : 17/432326
DATED : October 14, 2025
INVENTOR(S) : Fabian Knorr et al.

Page 1 of 1

It is certified that error appears in the above-identified patent and that said Letters Patent is hereby corrected as shown below:

In the Claims

At Column 13, Line 11: "potting body" should be -- a potting body --.

Signed and Sealed this
Eighteenth Day of November, 2025

John A. Squires
*Director of the United States Patent and Trademark Office*